US010295071B2

(12) United States Patent
Nguyen

(10) Patent No.: US 10,295,071 B2
(45) Date of Patent: May 21, 2019

(54) FLAPPER VALVE

(71) Applicant: Cantex International, Inc., Houston, TX (US)

(72) Inventor: Duy D. Nguyen, Cypress, TX (US)

(73) Assignee: Cantex International, Inc., Houston, TX (US)

( * ) Notice: Subject to any disclaimer, the term of this patent is extended or adjusted under 35 U.S.C. 154(b) by 21 days.

(21) Appl. No.: 15/625,166

(22) Filed: Jun. 16, 2017

(65) Prior Publication Data

US 2018/0363789 A1 Dec. 20, 2018

(51) Int. Cl.
*F16K 15/03* (2006.01)
*E21B 43/26* (2006.01)
*F16K 27/02* (2006.01)

(52) U.S. Cl.
CPC .............. *F16K 15/03* (2013.01); *E21B 43/26* (2013.01); *F16K 27/0227* (2013.01)

(58) Field of Classification Search
CPC ......... Y10T 137/7903; Y10T 137/7898; Y10T 137/86381; F16K 15/03; F16K 27/0227; E21B 2034/005; E21B 17/01
See application file for complete search history.

(56) References Cited

U.S. PATENT DOCUMENTS

| 362,651 | A | * | 5/1887 | Neary | F16K 15/03 |
| | | | | | 137/527.4 |
| 1,325,568 | A | * | 12/1919 | Leidecker | F16K 15/03 |
| | | | | | 137/515.7 |
| 1,577,637 | A | * | 3/1926 | Hess | F16K 15/03 |
| | | | | | 137/240 |
| 2,928,416 | A | * | 3/1960 | Balhouse | F16K 15/03 |
| | | | | | 137/527.8 |

(Continued)

FOREIGN PATENT DOCUMENTS

| GB | 811237 | 4/1958 |
| WO | 01/31167 A1 | 5/2001 |

(Continued)

OTHER PUBLICATIONS

FMC Technologies, *Flowline Products and Services—World Proven Chiksan® and Weco® Equipment* (undated).

(Continued)

*Primary Examiner* — Reinaldo Sanchez-Medina
*Assistant Examiner* — Nicole Gardner
(74) *Attorney, Agent, or Firm* — Keith B Willhelm

(57) ABSTRACT

Flapper valves may be provided in fluid transportation systems. The flapper valves comprise a body adapted for assembly into the system. The body comprises a first sub and a second sub which are removably assembled to each other. A passage is defined in the body which extends through the first and second subs. A seat is removably mounted in the (Continued)

passage. The seat is accessible by disassembling the first sub and the second sub. The valve also has a service port. A cap removably closes the port. A flapper is removably a mounted within the service port for pivoting movement between a closed position and an open position. In the closed position the flapper shuts off back flow through the passage. In the open position, the flapper allows fluid flow through the valve. The flapper is accessible by removing the cap from the service port.

26 Claims, 8 Drawing Sheets

(56) References Cited

U.S. PATENT DOCUMENTS

| | | | |
|---|---|---|---|
| 3,060,961 A | 10/1962 | Conley | |
| 3,119,594 A | 1/1964 | Heggem | |
| 3,393,704 A * | 7/1968 | McFarland, Jr. | F16K 5/06 137/593 |
| 3,565,107 A * | 2/1971 | Bunch | F16K 15/03 137/515.7 |
| 4,054,153 A | 10/1977 | Guyton | |
| 4,508,139 A | 4/1985 | Teumer | |
| 4,907,650 A | 3/1990 | Heinonen | |
| 5,497,802 A | 3/1996 | Whiteside | |
| 5,564,502 A | 10/1996 | Crow et al. | |
| 5,713,389 A | 2/1998 | Wilson, Jr. et al. | |
| 6,125,878 A | 10/2000 | Watts | |
| 6,196,261 B1 | 3/2001 | Dennistoun | |
| 6,543,474 B2 | 4/2003 | Fetterman | |
| 7,726,418 B2 | 6/2010 | Ayling | |
| 2010/0155143 A1 | 6/2010 | Braddick | |
| 2013/0000745 A1 | 1/2013 | Witkowski et al. | |
| 2014/0261789 A1 | 9/2014 | Hull | |
| 2014/0332277 A1 | 11/2014 | Churchill | |
| 2015/0276245 A1 | 10/2015 | Walters et al. | |
| 2017/0067327 A1 | 3/2017 | Harris et al. | |

FOREIGN PATENT DOCUMENTS

| | | |
|---|---|---|
| WO | 2016/147200 A1 | 9/2016 |
| WO | 2017/031449 A1 | 2/2017 |

OTHER PUBLICATIONS

FMC Technologies. *Wero® 3 15K Top Entry Check Valve* (Copyright 2016).
MIFAB, *BV1000 Cast Iron Backwater Valve with PVC Flapper* (Feb. 22, 2017).
Phoinix Global, Dwg. No. CVA3-3DRM-S01 (Nov. 4, 2011).
Tech-Seal International, *Flapper Check Valve Operation and Maintenance Manual* (Apr. 22, 2015).
Weir Oil & Gas, *SPM® Well Service Pumps & Flow Control Products* (Copyright 2014).
Weir, *SPM® Flow Control Products Catalog* (May 4, 2015).
Int'l Search Report, PCT Ser. No. PCT/US2018/034,825 (dated Aug. 20, 2018).
Written Opinion of the Int'l Searching Authority, PCT Ser. No. PCT/US2018/034,825 (dated Aug. 20, 2018).

* cited by examiner

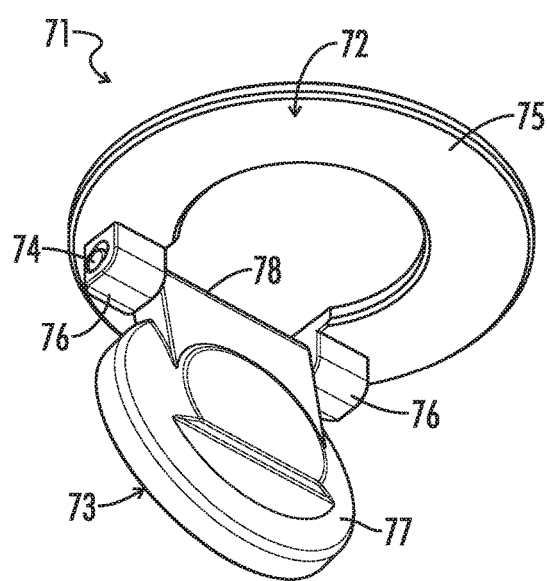
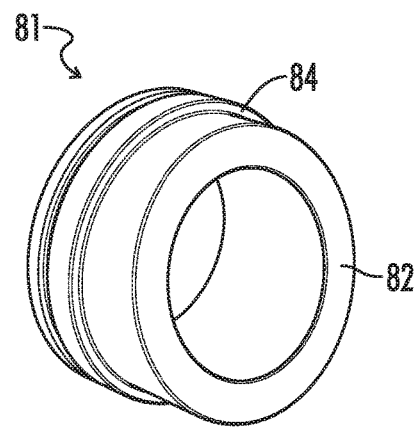
FIG. 8
FIG. 9

FLAPPER VALVE

FIELD OF THE INVENTION

The present invention relates generally to flapper valves, and especially to flapper check valves for fluid transportation systems conveying fluids under high pressure as are common, for example, in the oil and gas industry.

BACKGROUND OF THE INVENTION

Hydrocarbons, such as oil and gas, may be recovered from various types of subsurface geological formations. The formations typically consist of a porous layer, such as limestone and sands, overlaid by a nonporous layer. Hydrocarbons cannot rise through the nonporous layer. Thus, the porous layer forms a reservoir, that is, a volume in which hydrocarbons accumulate. A well is drilled through the earth until the hydrocarbon bearing formation is reached. Hydrocarbons then are able to flow from the porous formation into the well.

In what is perhaps the most basic form of rotary drilling methods, a drill bit is attached to a series of pipe sections referred to as a drill string. The drill string is suspended from a derrick and rotated by a motor in the derrick. A drilling fluid or "mud" is pumped down the drill string, through the bit, and into the well bore. This fluid serves to lubricate the bit and carry cuttings from the drilling process back to the surface. As the drilling progresses downward, the drill string is extended by adding more pipe sections.

A modern oil well typically includes a number of tubes extending wholly or partially within other tubes. That is, a well is first drilled to a certain depth. Larger diameter pipes, or casings, are placed in the well and cemented in place to prevent the sides of the borehole from caving in. After the initial section has been drilled, cased, and cemented, drilling will proceed with a somewhat smaller well bore. The smaller bore is lined with somewhat smaller pipes or "liners." The liner is suspended from the original or "host" casing by an anchor or "hanger." A well may include a series of smaller liners, and may extend for many thousands of feet, commonly up to and over 25,000 feet.

Hydrocarbons, however, are not always able to flow easily from a formation to a well. Some subsurface formations, such as sandstone, are very porous. Hydrocarbons are able to flow easily from the formation into a well. Other formations, however, such as shale rock, limestone, and coal beds, are only minimally porous. The formation may contain large quantities of hydrocarbons, but production through a conventional well may not be commercially practical because hydrocarbons flow though the formation and collect in the well at very low rates. The industry, therefore, relies on various techniques for improving the well and stimulating production from formations. In particular, various techniques are available for increasing production from formations which are relatively nonporous.

Perhaps the most important stimulation technique is the combination of horizontal well bores and hydraulic fracturing. A well will be drilled vertically until it approaches a formation. It then will be diverted, and drilled in a more or less horizontal direction, so that the borehole extends along the formation instead of passing through it. More of the formation is exposed to the borehole, and the average distance hydrocarbons must flow to reach the well is decreased. Fractures then are created in the formation which will allow hydrocarbons to flow more easily from the formation.

Fracturing a formation is accomplished by pumping fluid, most commonly water, into the well at high pressure and flow rates. Proppants, such as grains of sand, ceramic or other particulates, usually are added to the fluid along with gelling agents to create a slurry. The slurry is forced into the formation at rates faster than can be accepted by the existing pores, fractures, faults, vugs, caverns, or other spaces within the formation. Pressure builds rapidly to the point where the formation fails and begins to fracture. Continued pumping of fluid into the formation will tend to cause the initial fractures to widen and extend further away from the well bore, creating flow paths to the well. The proppant serves to prevent fractures from closing when pumping is stopped.

A formation rarely will be fractured all at once. It typically will be fractured in many different locations or zones and in many different stages. Fluids will be pumped into the well to fracture the formation in a first zone. After the initial zone is fractured, pumping is stopped, and a plug is installed in the liner at a point above the fractured zone. Pumping is resumed, and fluids are pumped into the well to fracture the formation in a second zone located above the plug. That process is repeated for zones further up the formation until the formation has been completely fractured.

Once the well is fractured, large quantities of water and sand that were injected into the formation eventually must be allowed to flow out of the well. The water and sand will be separated from hydrocarbons produced by the well to protect downstream equipment from damage and corrosion. The production stream also may require additional processing to neutralize corrosive agents in the stream.

Systems for successfully performing a fracturing operation, therefore, are extensive and complex, as may be appreciated from FIG. 1. FIG. 1 illustrates schematically a common, conventional frac system. Water from tanks 1 and gelling agents dispensed by a chemical unit 2 are mixed in a hydration unit 3. The discharge from hydration unit 3, along with sand carried on conveyors 4 from sand tanks 5 is fed into a blending unit 6. Blender 6 mixes the gelled water and sand into a slurry. The slurry is discharged through low-pressure hoses 7 which convey it into two or more low-pressure lines 8 in a frac manifold 9. The low-pressure lines 8 in frac manifold 9 feed the slurry to an array of pumps 10, perhaps as many as a dozen or more, through low-pressure "suction" hoses 11.

Pumps 10 take the slurry and discharge it at high pressure through individual high-pressure "discharge" lines 12 into two or more high-pressure lines or "missiles" 13 on frac manifold 9. Missiles 13 flow together, i.e., they are manifolded on frac manifold 9. Several high-pressure flow lines 14 run from the manifolded missiles 13 to a "goat head" 15. Goat head 15 delivers the slurry into a "zipper" manifold 16 (also referred to by some as a "frac manifold"). Zipper manifold 16 allows the slurry to be selectively diverted to, for example, one of two well heads 17. Once fracturing is complete, flow back from the fracturing operation discharges into a flowback manifold 18 which leads into flowback tanks 19.

Frac systems are viewed as having "low-pressure" and "high-pressure" sides or, more simply, as having low sides and high sides. The low side includes the components upstream of the inlet of pumps 10, e.g., water tanks 1, hydration unit 3, blending unit 6, and the low-pressure lines 8 of frac manifold 9, which operate under relatively low pressures. The high side includes all the components downstream of the discharge outlets of pumps 10, e.g., the high-pressure missiles 13 of frac manifold 9 and flow lines 14 running to goat head 15, which operate under relatively high pressures.

The flow lines and units making up the high-side of a frac system, such as pump discharge lines 12 and flow line 14, typically are assembled from a large number of individual components often referred to as "frac iron," "flow iron," or "ground iron." Such components include straight steel pipe, fittings for splitting, combining, or changing direction of a line, gauges and other monitoring equipment, and valves and other control devices. Flow iron components are fabricated from heavy, high tensile steel and are quite rugged. They may be rated for high-pressure service up to 20,000 psi.

Because frac systems are required at a site for a relatively short period of time, frac iron components often are joined by unions. Unions allow the components to be connected ("made up") and disconnected ("broken down") relatively quickly. The three types of unions commonly used in frac systems are hammer (or "Weco®") unions, clamp (or "Greyloc®") unions, and flange unions. Though spoken of in terms that may imply they are discreet components, unions are actually interconnected subassemblies of the components joined by the union. A male sub will be on one component, and a mating female sub will be on the other. The subs then will be connected to each other to provide the union.

The optimal volume, pumping rate, and pumping schedule for a fracturing operation will be determined in view of the physical properties of the formation, the depth at which it will be fractured, and the fluid that will be pumped into the formation. Such pumping regimens may vary considerably and, as noted above, typically proceeds in multiple stages. Thus, fluid flow through the frac system is carefully controlled and monitored throughout the operation.

Fluid is designed to flow through most of a frac system in only one direction: towards the well. Once pumping is stopped, however, large quantities of slurry will flow out of the well at rates and pressures at least initially comparable to those used to fracture the well. Shut off valves will be installed in the system to divert that return flow into recovery tanks and to protect upstream portions of the system. In particular, pumps must be protected against back flow. Actuating shut off valves, however, may take some time. Operators also may neglect to open or shut the appropriate valves. Thus, frac systems commonly will incorporate various automatic check valves to ensure that fluid is able to travel in only one direction through a particular part of the system.

The check valves in frac systems generally are "flapper" style check valves. Flapper valves, as their name suggests, incorporate a pivoting flapper. The flapper normally hangs down, under the influence of gravity, across the face of a seat provided in the valve conduit. Fluid flowing through the valve conduit in the desired direction will push against the flapper, causing it to swing up and allow fluids to pass through the valve. Flow in the opposite, undesired direction, however, will cause the flapper to bear and seal against the seat, shutting off back flow through the valve.

Flapper valves are better suited than other check valves, such as dart check valves, for systems handling particulate laden, abrasive fluids such as frac fluids. Particulate matter is less likely to interfere with the operation of flapper valves. Eventually, however, the flapper and seat can become eroded such that the ability of the valve to check flow in the opposite direction is impaired. Thus, many conventional flapper valves have designs which allow the flapper and the seat to be replaced periodically. Such valves include what may be referred to as inlet entry and top entry designs.

Inlet entry designs, such as Weco® flapper check valves available from FMC Technologies, Inc, Houston, Tex., have a replaceable assembly that includes both the seat and the flapper. The seat-flapper assembly is carried within the valve conduit. The assembly may be accessed for replacement by disassembling a two-part valve body. Once the inlet end of the valve body is removed, the seat-flapper assembly may be pulled out of the outlet end, and a new assembly inserted. Necessarily, however, the valve must be disassembled from the flow line in order to replace either the flapper or the seat.

Top entry designs have separate flappers and seats which may be accessed through a service port. Examples of such top entry flapper valves include those available from Tech-Seal International (TSI Flow Products), Houston, Tex., Weco top entry valves available from FMC Technologies, and SPM® 1502 clapper valves available from S.P.M. Flow Control, Inc., Fort Worth, Tex. In top entry valves, the valve body is a single integral piece which is provided with a service port extending from the top of the valve into the valve conduit. The service port is covered by a cap which can be removed to access the flapper and seat. The seat, for example, may be carried in the inlet end of the valve conduit. The flapper may be mounted on a bracket which rests on a shoulder in the service port and is held there by the access cap.

A primary advantage of top entry valves is that the flapper and seat may be replaced without removing the valve from a flow line. A disadvantage lies in the installation of the seat. The seat must be installed securely so that it is not displaced as fluid flows through the valve. Threaded seats are difficult to align with the flapper, and so typically threaded seats are provided with vertical seat faces. Pressure fitted seats may be difficult to install and remove. With both approaches, special tools may be required.

Flapper valves, like other flow iron components, are fabricated from steel and are quite rugged. Nevertheless, they can suffer shortened service life or failure due to the harsh conditions to which they are exposed. Not only are fluids pumped through the system at very high pressure and flow rates, but the fluid is abrasive and corrosive. Components may suffer relatively rapid erosion. Any failure of flapper valves on site may interrupt fracturing, potentially reducing its effectiveness and inevitably increasing the amount of time required to complete the operation.

Frac jobs also have become more extensive, both in terms of the pressures required to fracture a formation and the time required to complete all stages of an operation. Prior to horizontal drilling, a typical vertical well might require fracturing in only one, two or three zones at pressures usually well below 10,000 psi. Fracturing a horizontal well, however, may require fracturing in 20 or more zones. Horizontal wells in shale formations such as the Eagle Ford shale in South Texas typically require fracturing pressures of at least 9,000 psi and 6 to 8 hours or more of pumping. Horizontal wells in the Haynesville shale in northeast Texas and northwest Louisiana require pressures around 13,500 psi. Pumping may continue near continuously—at flow rates of 2 to 3 thousand gallons per minute (gpm)—for several days before fracturing is complete.

A problem with all flapper valves derives from the fact that they necessarily require an enlarged area within the passage to accommodate installation and operation of the seat and flapper. That is especially true for inlet entry designs. The enlarged portion of the passage in turn cause turbulence in fluids flowing through the valve. Turbulence in the valve not only creates pressure losses in the flowline, but can dramatically increase the rate of erosion in the valve, especially when the fluids are laden with abrasive particulates. The seat and flapper in particular are highly exposed to turbulence in the valve and its attendant erosion.

The statements in this section are intended to provide background information related to the invention disclosed and claimed herein. Such information may or may not constitute prior art. It will be appreciated from the foregoing, however, that there remains a need for new and improved pressure release valves and methods for protecting high-pressure flowlines from excessive pressure. Such disadvantages and others inherent in the prior art are addressed by various aspects and embodiments of the subject invention.

SUMMARY OF THE INVENTION

The subject invention, in its various aspects and embodiments, relates generally to flapper check valves and encompasses various embodiments and aspects, some of which are specifically described and illustrated herein. One broad aspect of the invention provides for a flapper valve for fluid transportation systems. The flapper valve comprises a body adapted for assembly into the system. The body comprises a first sub, such as an inlet sub, and a second sub, such as an outlet sub, which are removably assembled to each other. A passage is defined in the body. The body extends through the first and second subs and is adapted to conduct fluids transported through the system. A seat is removably mounted in the passage. The seat is accessible by disassembling the first sub and the second sub. The valve also comprises a service port. A cap removably closes the service port. A flapper is removably mounted within the service port for pivoting movement between a closed position and an open position. In the closed position, the flapper bears on the seat and shuts off back flow through the passage. In the open position, the flapper is pivoted away from the seat and allows fluid flow through the valve. The flapper is accessible by removing the cap from the service port.

Other embodiments provide flapper valves where the body is adapted for assembly into the system by hammer unions or by other conventional unions.

In other embodiments, the first sub of the flapper valve comprises a flange. The flange has a plurality of holes adapted to accommodate threaded connectors and the first sub is assembled to the second sub by threaded connectors extending through the holes.

Yet other embodiments include such flapper valves where the passage is substantially cylindrical.

In other aspects and embodiments, the invention provides flapper valves where the seat is provided on an insert slidably received in the passage, where the insert is received in the second sub, where the insert is captured in the passage between the first sub and the second sub, where the insert is restricted from rotating within the passage, and/or the insert is restricted from rotating within the passage by a pin extending between the insert and the first sub.

Other embodiments provide such flapper valves where the seat is angled off vertical or the seat is provided on a beveled surface of the insert.

Still other embodiments provide flapper valves where the cap has a skirt depending therefrom and extending downward into the port and the skirt defines a blind chamber within the cap. In other embodiments, the flapper valves comprise a filler body disposed within the chamber in the cap. Additional embodiments provide such flapper valves where clearances are provided between the filler body and the skirt.

The subject invention in other aspects and embodiments provide flapper valves where the flapper is pivotally connected to a bracket. The bracket is mounted on an upward facing lip provided in the service port and is held thereon by the cap. Other embodiments provide such flapper valves where the flapper is pivotally connected to the bracket by a pin extending through a plurality of knuckles provide on the bracket and the flapper or where the knuckles extend substantially continuously along the length of the pin.

Still other embodiments provide flapper valves where the service port comprises a lip adapted to receive the bracket. The lip defines an opening having a rectilinear end and an arcuate end approximating the periphery of the flapper.

In other aspects and embodiments, the invention provides for flapper valves for fluid transportation systems which comprise a body adapted for assembly into the system. A passage is defined in the body. The passage is adapted to conduct fluids transported through the system. The valve also comprises a service port. A cap removably closes the port. The cap has a skirt depending therefrom and extending downward into the service port. The skirt defines a blind chamber within the cap. A filler body is disposed within the chamber in the cap.

Other embodiments provide such flapper valves where the filler body occupies substantially the entire volume of the chamber or where clearances are provided between the filler body and the chamber, the clearances allowing the cap to be energized by fluid flowing through the valve.

In additional aspects, the novel flapper valves incorporate various combinations of such features as will be apparent to workers in the art.

Still other embodiments of the invention provide for flow lines for a high-pressure fluid transportation system. The flow lines comprise the novel flapper valves. Additional embodiments provide high-pressure fluid transportation systems which comprise the novel flow lines, including systems for fracturing a well.

The invention also provides embodiments directed to methods for controlling flow through a fluid transportation system which comprise a flow line. The method comprises providing the flow line with a novel flapper valve and transporting fluid through the flow line.

Finally, still other aspects and embodiments of the invention provide apparatus and methods having various combinations of such features as will be apparent to workers in the art.

Thus, the present invention in its various aspects and embodiments comprises a combination of features and characteristics that are directed to overcoming various shortcomings of the prior art. The various features and characteristics described above, as well as other features and characteristics, will be readily apparent to those skilled in the art upon reading the following detailed description of the preferred embodiments and by reference to the appended drawings.

Since the description and drawings that follow are directed to particular embodiments, however, they shall not be understood as limiting the scope of the invention. They are included to provide a better understanding of the invention and the manner in which it may be practiced. The subject invention encompasses other embodiments consistent with the claims set forth herein.

BRIEF DESCRIPTION OF THE DRAWINGS

FIG. 8 is an isometric view, taken generally from below, of a flapper assembly 73 which is incorporated into flapper valve 20.

FIG. 9 is an isometric view of seat insert 81 which is incorporated into flapper valve 20.

Figure 1:
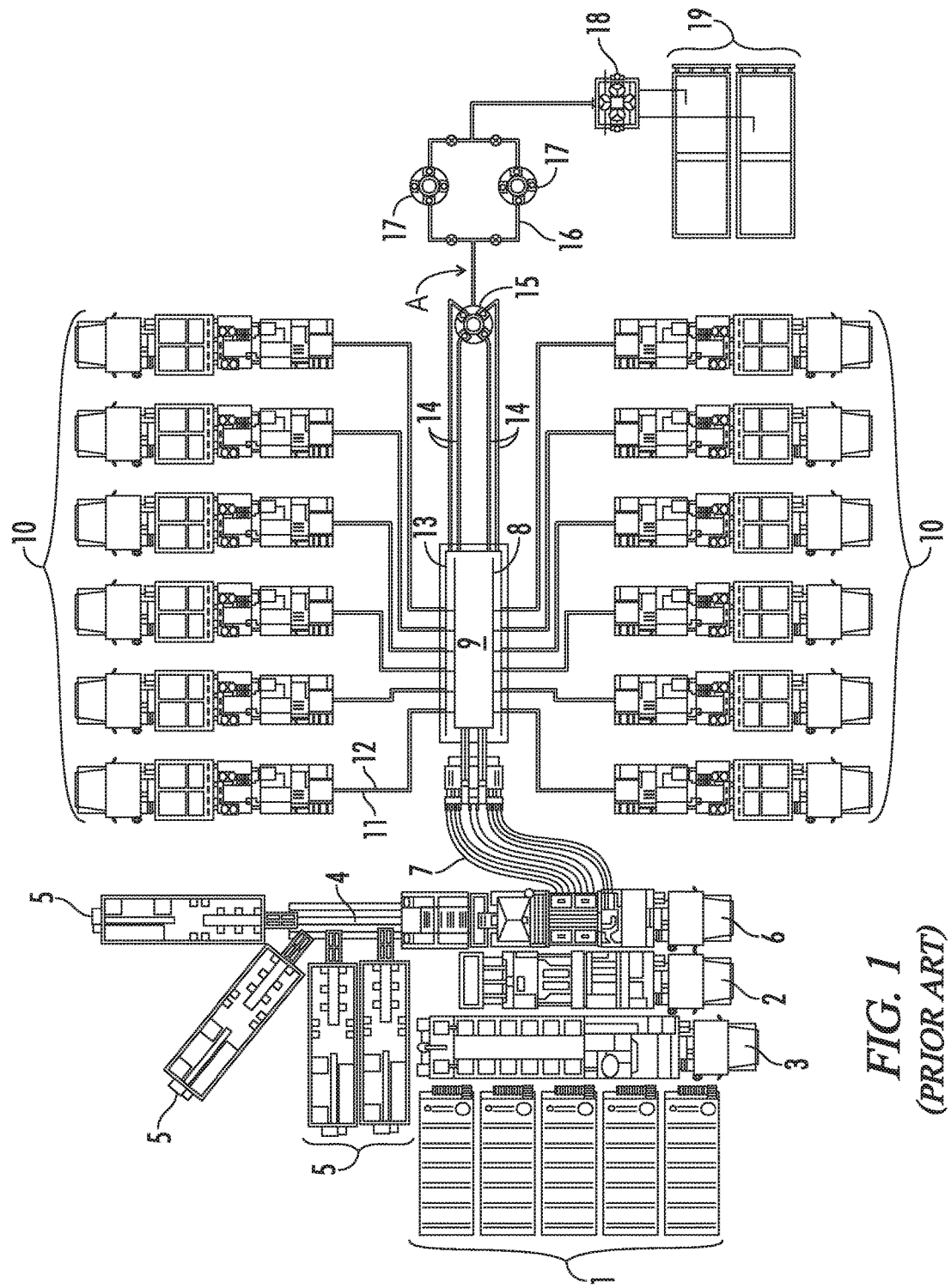
FIG. 1 (prior art) is a schematic view of a system for fracturing a well and receiving flowback from the well, which system includes various high-pressure flow lines, such as flow lines 12 and 14.

In the drawings and description that follows, like parts are identified by the same reference numerals. The drawing figures are not necessarily to scale. Certain features of the embodiments may be shown exaggerated in scale or in somewhat schematic form and some details of conventional design and construction may not be shown in the interest of clarity and conciseness.

DESCRIPTION OF ILLUSTRATIVE EMBODIMENTS

The subject invention, in various aspects and embodiments, is directed generally to flapper valves for flowlines, and especially for high-pressure flowlines. Specific embodiments will be described below. For the sake of conciseness, however, all features of an actual implementation may not be described or illustrated. In developing any actual implementation, as in any engineering or design project, numerous implementation-specific decisions must be made to achieve a developers' specific goals. Decisions usually will be made consistent within system-related and business-related constraints, and specific goals may vary from one implementation to another. Development efforts might be complex and time consuming and may involve many aspects of design, fabrication, and manufacture. Nevertheless, it should be appreciated that such development projects would be a routine effort for those of ordinary skill having the benefit of this disclosure.

Broad embodiments of the novel valves are directed to valves which may be used in fluid transportation systems. They comprise a body which is adapted for assembly into a flow line and comprises two subs which may be assembled and disassembled. A replaceable seat may be accessed by disassembling the body subs. A replaceable flapper assembly may be accessed through a service port. Other broad embodiments include a flapper valves where the service port is covered by a removeable cap. The cap has a skirt extending downward into the service port. A filler body is mounted within the skirt. It is believed that the novel flapper valves will offer longer service life and may be rebuilt more easily.

The novel flapper valves may be used in a variety of systems. They are particularly useful in high pressure flow lines as are common in chemical and other industrial plants, on marine dredging vessels, strip mines, and especially in the oil and gas industry. Certain embodiments are particularly well suited as components of temporary pipe and flow line installations. Hydraulic fracturing systems, such as those shown in FIG. 1, are a very common application where flapper valves are a practical necessity. They may be assembled into portions of the high-pressure side of a frac system where fluid is intended to flow only in one direction. The novel flapper valves readily allow flow in the desired direction. If downstream conditions otherwise would induce back flow through the system, however, the novel valves will automatically shut off and substantially preclude back flow through the system.

For example, the novel flapper valves may be assembled at point A into the high-pressure flow line running from goat head 15 to zipper manifold 16 in the frac system shown in FIG. 1. Flow at point A is intended to go in only one direction: from goat head 15 into zipper manifold 16. In the absence of a flapper valve, back flow through the flow line may damage pumps 10.

A preferred flapper valve 20 is shown in greater detail in FIGS. 2-9. As shown therein, valve 20 generally comprises a valve body 21 which is assembled from an inlet sub 24 and an outlet sub 25. Valve body 21 defines a central passage 22 and a service port 23. Service port 23 is closed by a removable cap 26. Valve body 21 also provides a housing for various internal components of valve 20, including a replaceable flapper assembly 71 and a replaceable seat insert 81. As described further below, flapper assembly 71 will allow flow in only one direction through passage 22 and valve 20. Flapper assembly 71 can be accessed and replaced through service port 23 by removing cap 26. Seat insert 81 can be accessed and replaced by disassembling inlet sub 24 and outlet sub 25.

Flapper valve 20 is adapted for assembly into flow lines of systems such as the frac system shown in FIG. 1. Thus, flapper valve 20 is provided with hammer union ends which will allow it to be quickly and easily made up or broken down from the system. More particularly, a female hammer union sub or end 41 is provided at the outer end of inlet sub 24. Female end 41 has external threads 42, an elastomeric seal 43, and an annular bearing surface 44. A male hammer union sub or end 51 is provided at the outer end of outlet sub 25. Male end 51 has an internally threaded annular lug nut 52, which is mounted thereon via a plurality of retainer segments 53, and an annular bearing surface 54. Female end 41 and male end 51 allow flapper valve 20 to be made up and broken down from flow lines via hammer unions with other flowline components.

The design and configuration of such hammer unions are well known in the art and will not be further described herein. Suffice it to say, however, that any conventional hammer union design may be incorporated into the novel valves. Valves may be provided with male ends on the inlet and female ends on the outlet, or with either male or female ends on both the inlet and outlet. Likewise, the valves may be provided with ends that allow them to be made up and broken down by conventional clamp or flange unions, by threaded connections, or by any other conventional assembly methods.

As its name implies, valve body 21 comprises the major structural portion of flapper valve 20 and defines many of its primary features. In particular, central passage 22 provides a conduit for fluids conveyed through valve 20 and the flow line into which it is assembled. Central passage 22 has a generally cylindrical shape and extends from an inlet 45 on inlet sub 24 to an outlet 55 on outlet sub 25. It has a substantially smooth and uniform inner surface for much of its extent. Ideally, it would be smooth and uniform along its entire length. Passage 22, however, is enlarged somewhat in the central portion of valve 20 to provide room for flapper assembly 71 to function. That enlarged portion of passage 22 may be referred to as flapper chamber 27.

Flapper assembly 71, as best seen in FIG. 8, comprises a bracket 72, a flapper 73, and a pin 74. Bracket 72 has a relatively thin, substantially annular base 75 which is provided with a pair of hinge knuckles 76. Flapper 73 is a somewhat thick, generally disc shaped closure member 77 with a knuckle 78 extending rectilinearly from one side thereof. Pin 74 extends through cylindrical openings in knuckles 76 and 78. Flapper 73 is able to pivot about pin 74 to automatically open or close valve 20.

Figure 2:
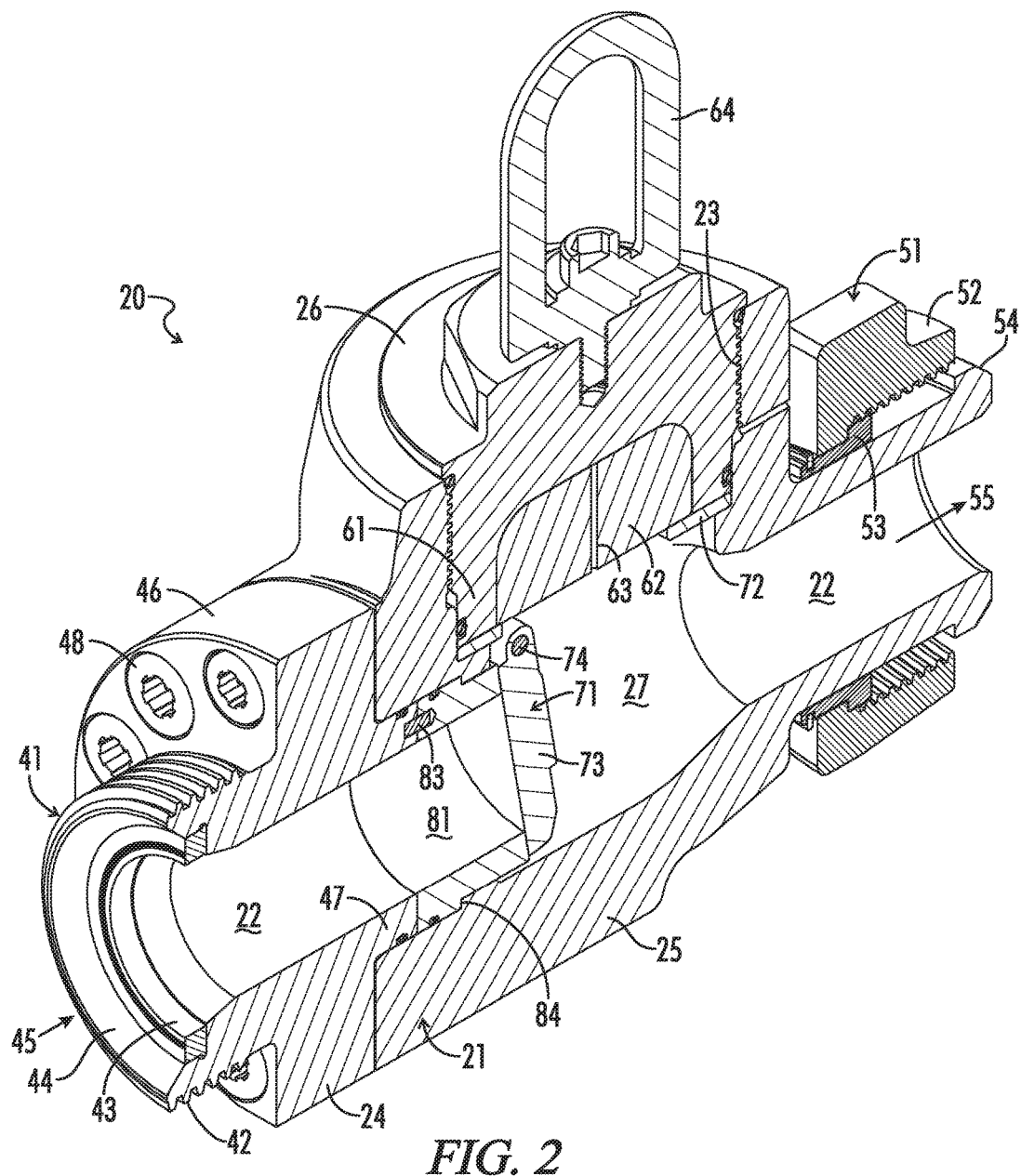
FIG. 2 is an isometric, axial cross-sectional view of a first preferred embodiment 20 of the flapper valves of the subjection invention taken generally above, in front of, and from one side of flapper valve 20. Flapper valve 20 is shown oriented as it would be if installed, for example, in a fluid transportation system such as the fracturing system shown in FIG. 1. Flapper 73 in in its normal, "closed" position.
Figure 3:
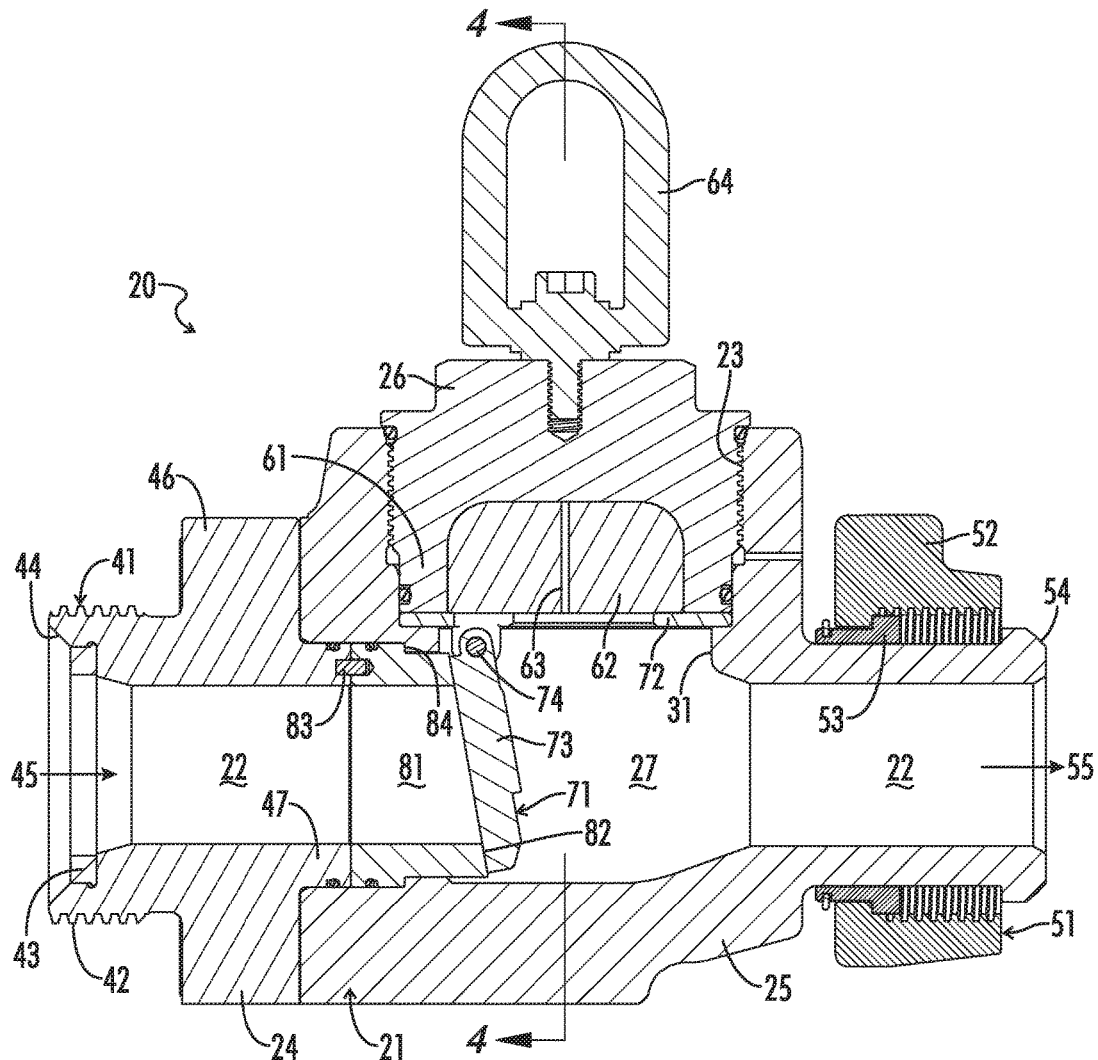
FIG. 3 is an axial, side cross-sectional view of flapper valve 20 shown in FIG. 2, again showing flapper valve 20 in its installed orientation.
Figure 4:
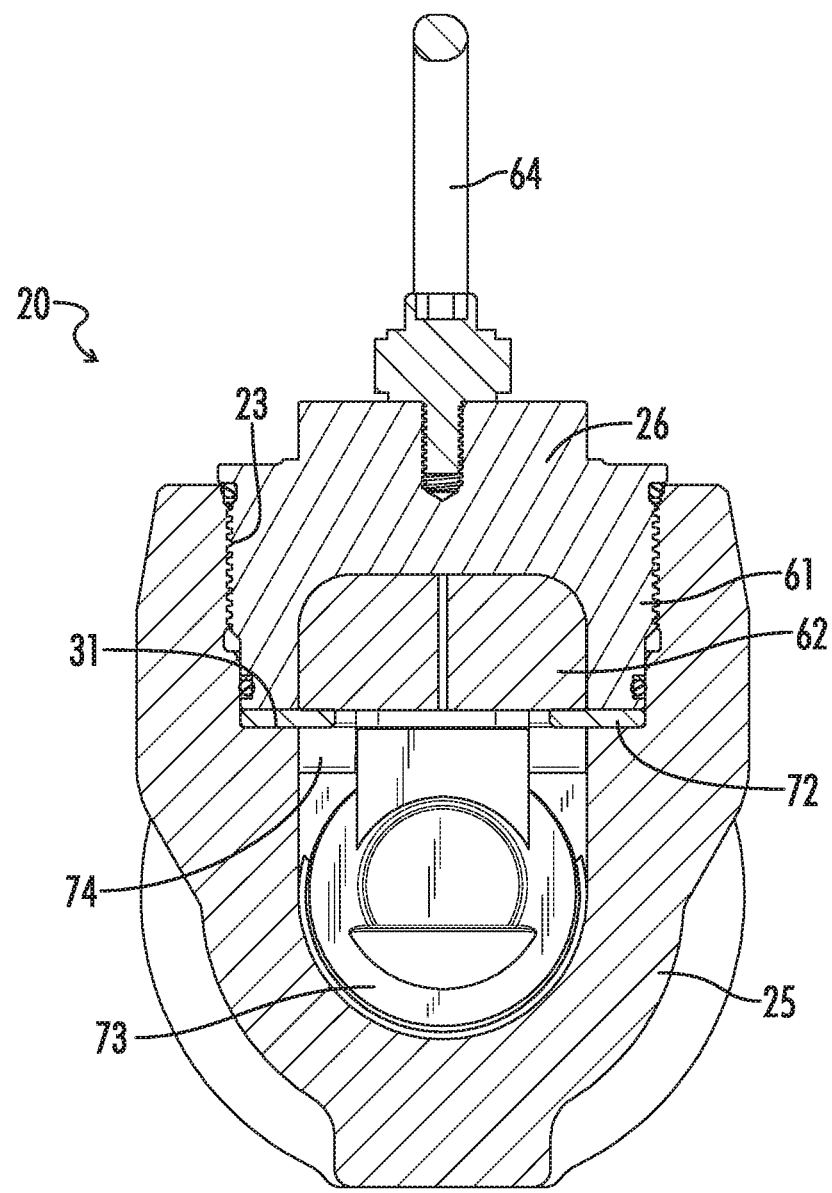
FIG. 4 is a transverse cross-sectional view of flapper valve 20 taken along line 4-4 of FIG. 3.
Figure 5:
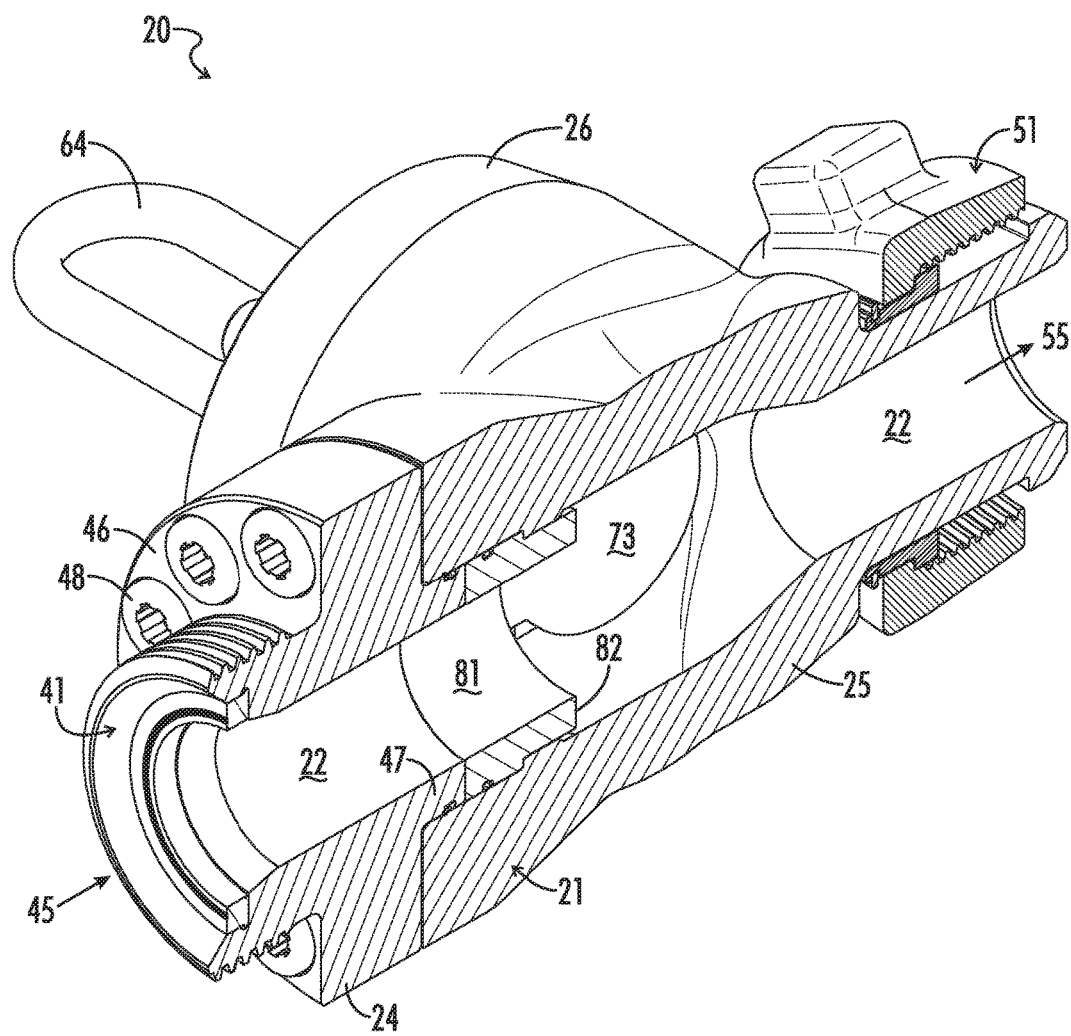
FIG. 5 is an isometric, axial cross-sectional view of flapper valve 20 taken generally from below valve 20 and in which flapper 73 is shown in its pivotally upward, "open" position.
Figure 6:
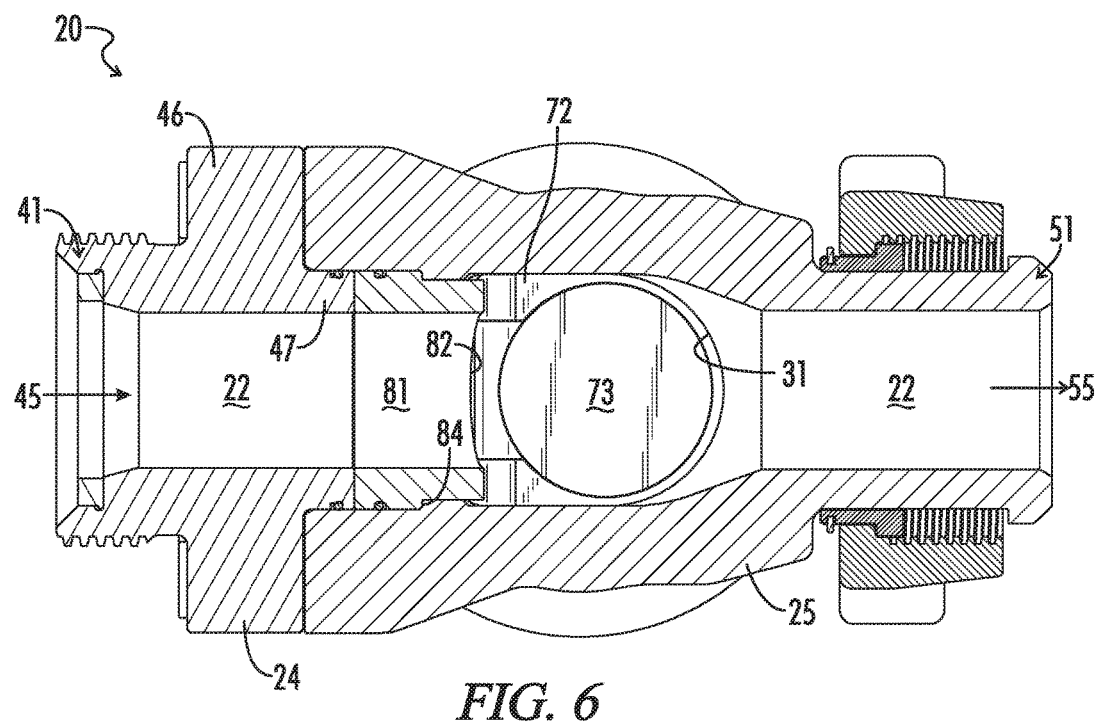
FIG. 6 is an axial cross-sectional view of flapper valve 20 taken below valve 20 in which flapper 73 is in its pivotally upward, open position.

As seen best in FIG. 9, seat insert 81 is a generally open, relatively short cylindrically shaped component. The inner surface of insert 81 preferably is substantially smooth, continuous, and lacking in internal profiles. Its internal diameter, as appreciated from FIGS. 2-3, is sized to approximate the internal diameter of passage 22 as it extends through inlet sub 24 and the male end 51 of outlet sub 25. The inner end of insert 81 is beveled to provide a substantially flat, angled seating surface 82.

Flapper valve 20 is designed to allow flow in only one direction: into inlet 45 and out outlet 55. It will automatically shut off back flow, i.e., flow from outlet 55 toward inlet 45. The manner in which it does so may be appreciated by first referencing, for example, FIGS. 2-3. Those figures show valve 20 as it would be oriented for assembly into a flow line. That is, service port 23 and cap 26 are on top of valve 20. Flapper 73 will hang down on pin 74 into flapper chamber 27 under the influence of gravity. The relative location of flapper pin 74 and insert 81 is such that seat 82 extends through and beyond the center of gravity of flapper 73. Insert 81 also is oriented such that seat 82 is normal to a vertical plane through passage 22, but at a slight angle off of vertical. Flapper closure 77, therefore, will tend to rest on seat 82.

In this "normal" or "shut" position, fluid entering outlet 55 of valve 20 will cause closure 77 of flapper 73 to bear against seat 82 of insert 81, thus shutting off back flow through valve 20. Fluid flowing into valve 20 through inlet 45, however, will cause flapper 73 to pivot up through chamber 27 toward bracket 72, allowing fluid to flow through valve 20.

Flapper assembly 71, as noted above, may be removed without any special tools and can be accessed and replaced through service port 23. Service port 23 extends through an upward extension on valve body 21 and is has a run of inner threads, such as ACME threads, along its upper portion. Cap 26 is provided with corresponding outer threads such that cap 26 may be threaded into and out of service port 23. A pressure seal preferably is provided between cap 26 and service port 23 to ensure that cap 26 provides a leak-proof closure for service port 23. For example, elastomeric o-rings and backup rings may be provided in a groove extending around the outer surface at the lower end of cap 26. Seals also may be provided at the top of cap 23 to protect the threads from dirt. Service port 23 is not intended to conduct fluids out of valve 20, and is instead provided to allow access to flapper assembly 71.

Figure 7:
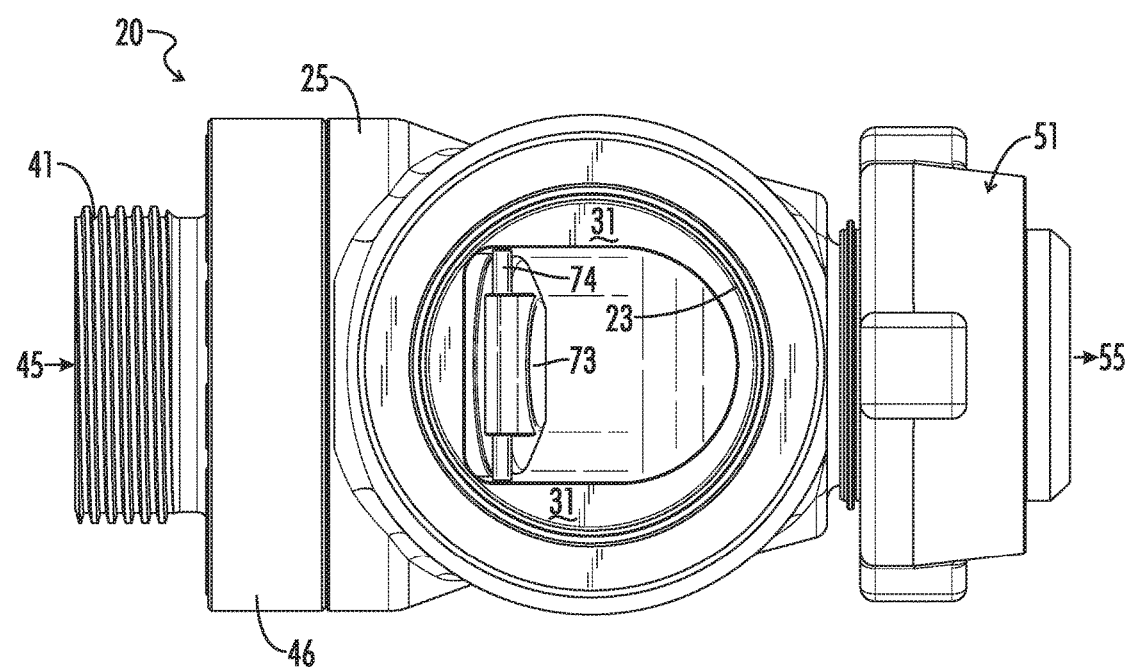
FIG. 7 is a top view of valve 20 in which cap 26 and bracket 72 have been removed to reveal details of service port 23.

Flapper assembly 71 is removably mounted within service port 23. For example, service port 23 is provided with a ledge or lip 31 which extends radially inward at the lower end of port 23. Base 75 of bracket 72 rests on lip 31 and is held there by cap 26, the lower end of which will bear on base 75 when cap 26 is threaded fully into port 23. Lip 31 also defines an opening which can accommodate flapper 73 when it has pivoted up into its "open" position. The opening, as best seen in FIG. 7, is rectilinear at one end and arcuate at the other. The arcuate end will closely accommodate the end of flapper 73 in its upward, open position. The opening defined by lip 31, and service port 23, however, are sized such that flapper assembly may be easily installed and removed simply by removing cap 26.

Flapper assembly 71 and its components 72/73/74 have simple designs which allow flapper assembly 71 to perform efficiently and reliably. They may be mounted simply and easily in valve 20, and have other advantages discussed elsewhere herein. The invention, however, is not limited to the specific designs of flapper 73 or flapper assembly 71 illustrated herein, or the specific way in which those components are mounted within service port 23. A variety of designs are known and may be adapted for use in the novel valves.

As noted above, seat insert 81 can be accessed and replaced by disassembling inlet sub 24 and outlet sub 25. Thus, for example, inlet sub 24 is provided with an annular flange 46 and an annular boss 47. Annular flange 46 extends around a midportion of inlet sub 24. Annular boss 47 extends inward from flange 46 at the inner end of inlet sub 24. Thus, inlet sub 24 may be joined to outlet sub 25 by inserting annular boss 47 on inlet sub 24 into an enlarged diameter portion of passage 22 in outlet sub 25. A pressure seal preferably is provided between boss 47 and passage 22, for example, by mounting elastomeric o-rings and backup rings in a groove extending around the outer surface of annular boss 47.

Inlet sub 24 then may be secured to outlet sub 25, for example, by threaded bolts 48 which extend through openings in flange 46 and into threaded openings (not shown) in the inner end of outlet sub 25. Alternately, outlet sub 25 may be provided with standing bolts and inlet sub 24 secured by nuts. Inlet sub 24 also may be threaded into outlet sub 25, or vice versa. Other conventional means may be used to assemble inlet sub 25 and outlet sub 26 such that they may be disassembled.

Seat insert 81 is removably mounted in the enlarged portion of passage 22 at the inner end of outlet sub 25. More particularly, as will be appreciated from FIGS. 2-3, insert 81 may be slid into the enlarged portion of passage 22 which opens at the inner end of outlet sub 25. A pressure seal preferably is provided between insert 81 and passage 22, for example, by mounting elastomeric o-rings and backup rings in a groove extending around the outer surface of insert 81.

As best seen in FIGS. 2-3 and 9, the outer surface of seat insert 81 has a reduced diameter inner portion which defines an inward facing shoulder 84. When inserted into passage 22, inward facing shoulder 84 on insert 81 will abut and bear on a corresponding, outward facing shoulder provided in passage 22. Annular boss 47 on inlet sub 24 will bear on the outer end of insert 81, such that insert 81 will be securely mounted in valve 20 when inlet sub 24 is assembled to outlet sub 25. In essence, insert 81 is captured between inlet sub 24 and outlet sub 25. More specifically, the enlarged outer diameter portion of insert 81 is captured between annular boss 47 and the outward facing shoulder in passage 22. Though not readily apparent in the figures, the extension of annular boss 47 is such that a clearance will be maintained between the inner surface of flange 46 and the inner end of outlet sub 25, thus ensuring that annular boss 47 will bear on insert 81.

Preferably, insert 81 will fit closely with passage 22, but loosely enough to allow insert 81 to be inserted and removed from passage 22 by hand and without the need for special tools. A pin 83 extending into corresponding holes in insert 81 and inlet sub 24 preferably is provided to ensure proper alignment of insert 81 with flapper 73. Other alignment means, such as keys and grooves, however, may be provided.

In the event that seat 82 on insert 81 is unacceptably compromised by erosion, inlet end 24 may be disassembled from outlet end 25 to allow replacement of seat insert 81. Insert 81 preferably will be removeable by hand without the need for special tools. If desired, however, other conventional means of mounting a seat within the inlet portion of the valve passage may be provided, such as threading an insert into, or pressure fitting it with the passage.

Cap 26 preferably provides self-energizing seals with service port 23. That is, cap 26 has what may be viewed as an annular skirt 61 which depends from the upper portion of cap 26. When cap 26 is threaded into service port 23, skirt 61 of cap 26 will extend through the lower portion of service port 23 and bear on flapper bracket 72. Skirt 61 defines a blind chamber within cap 26. A filler body 62 is disposed therein. Preferably, filler 62 substantially occupies the entire volume of the blind chamber within cap 26 such that together with cap 26, there is substantially no open space above flapper assembly 71. Filler 62 also fits closely within the chamber in cap 26 so as to substantially preclude circulation of fluid in the chamber. At the same time, clearances preferably are provided between filler 62 and skirt 61 and the rest of cap 26 so that some small amounts of fluid are able to enter the clearances to energize cap 26. Filler 62 preferably is provided with a passage 63 to facilitate ingress of fluids and, given the tight clearances, to facilitate insertion of filler 62 into the chamber. When assembled, filler 62 necessarily will be held securely in place, but adhesives and the like may be used to hold filler 62 in place when cap 26 is removed from valve 20.

It will be appreciated that in conventional valves having caps similar to cap 26, but lacking a filler body such as filler 62, fluid is able to freely circulate within the chamber in the cap. By allowing fluid into the chamber, the cap will be energized. That is, hydraulic pressure will be applied radially outward onto the skirt, thus enhancing the seal between the cap and the service port. On the other hand, by allowing fluid to circulate within the cap, turbulence in the valve is greatly increased. In contrast, by providing a closely fitting filler body, such as filler 62, embodiments of the novel valves obtain the benefits of a self-energizing cap without the detrimental effects of increased turbulence.

It also will be appreciated that embodiments of the novel valves are able to minimize the volume of the enlarged flapper chamber with the valves while providing important additional benefits. For example, mounting seat insert 81 within passage 22 and accessing it by disassembling inlet sub 24 allows seat insert 81 to be mounted in such as fashion as will allow for easy installation without the need for any special tools. Because flapper assembly 71 is still accessed through service port 23, however, flapper chamber 27 need not be as large as with conventional inlet entry designs. Minimizing the size of flapper chamber 27, other factors being equal, will tend to reduce turbulence through valve 20 and attendant erosion.

Valve 20 is provided with other features which help to reduce turbulence or otherwise reduce erosion. The portion of passage 22 extending through inlet sub 24 and the smooth, continuous inner surface of seat insert 81 provides a relatively long conduit which will encourage more laminar flow into valve 20. As seen best in FIGS. 5-6, when flapper 73 is in its up or open position, the opening defined by lip 31 in service port 23 will closely accommodate a substantial portion, approximately half of the circumference of flapper 73. That will not only protect flapper 73 from erosive flow, but it will help minimize turbulence through chamber 27. It also will be noted that knuckles 76 and 78 on, respectively, bracket 72 and flapper 73 more or less abut end-to-end such that pin 74 is substantially enclosed therein and protected from fluid flow.

In general, the various components of the novel unions may be fabricated by methods and from materials commonly used in manufacturing flowline components. Given the extreme stress and the corrosive and abrasive fluids to which flowline components are exposed, especially those designed for high-pressure flow lines, suitable materials will be hard and strong. For example, excepting their seals, the components of novel pressure relieve valves may be fabricated from 4130 and 4140 chromoly steel or from somewhat harder, stronger steel such as 4130M7, high end nickel alloys, and stainless steel. The flapper assembly and seat inserts preferably will be fabricated from stainless steel or the other harder steels. The components may be made by any number of conventional techniques, but typically and in large part will be made by forging, extruding, or mold casting a blank part and then machining the required features into the part.

A suitable filler body may be made of any relatively durable material. It may be made of steel, for example, but typically it will be made from less dense materials so as to reduce the overall weight of the valve. Hard plastics, such as polypropylene, polycarbonates, and Nylon 6, Nylon 66, and other polyamides, may be used. Hard rubbers, such as butadiene rubbers and ebonite also may be used. In addition, coatings or coverings may be applied to the flapper to protect it from erosion. For example, it may be provided with a rubber covering, such as carboxylated nitrile butadiene rubber (XNBR) or urethane rubber.

The novel valves also have been illustrated as assembled from various components. For example, valve body 21 is assembled from inlet sub 24 and outlet sub 25. If desired, however, additional subs may be used to assemble valve body 21, for example, to facilitate fabrication of the subs. Other embodiments may have an integral, one-piece valve body. Similarly, some embodiments may employ other conventional cap designs to removably close the service port, or they use the illustrated design without a filler body.

The novel valves also will incorporate various features of conventional valves and connections. For example, flapper valves are quite heavy and, therefore, preferably incorporate components which make it easier to handle and manipulate the valve. Valve 20, for example, is provided with a lifting eye 64 which is threaded into service port cap 26. The exemplified valves have been described as incorporating various seals and specific unions. Other conventional features, however, may be incorporated into the novel valves as will be readily appreciated by workers in the art having the benefit of this disclosure.

Similarly, the novel valves have been described in the context of frac systems. While frac systems in particular and the oil and gas industry in general rely on flapper valves, especially in high-pressure applications, the novel valves are not limited to such applications or industries. Likewise, they are not limited in their application to the specific, exemplified tap lines or to the mentioned pressure ratings. Suffice it to say that the novel flapper valves have wide applicability wherever flapper valves have been conventionally applied.

It also will be appreciated that the terms such as "upper," "lower," "inner," and "outer," are made with reference to the orientation in which the novel valves are will be when assembled into a flowline, for example, as illustrated in FIG. 3. The novel valves necessarily will be installed with the central passage running substantially horizontally if the flapper is to operate as intended.

While this invention has been disclosed and discussed primarily in terms of specific embodiments thereof, it is not intended to be limited thereto. Other modifications and embodiments will be apparent to the worker in the art.

What is claimed is:

1. A flapper valve for fluid transportation systems, said flapper valve comprising:
   (a) a valve body adapted for assembly into said system, said body comprising a first sub and a second sub removably assembled to each other;
   (b) a passage defined in said body and extending through said first and second subs, said passage being adapted to conduct fluids transported through said system;
   (c) a seat removably mounted in said passage, said seat being accessible for replacement only by disassembling said first sub and said second sub;
   (d) a service port and a cap removably closing said port;
   (e) a flapper removably mounted within said service port for pivoting movement between a closed position, in which said flapper bears on said seat and shuts off back flow through said passage, and an open position, in which said flapper is pivoted away from said seat and allows fluid flow through said valve; said flapper being accessible for replacement only by removing said cap from said service port.

2. The flapper valve of claim 1, wherein said first sub comprises a flange comprising a plurality of holes adapted to accommodate threaded connectors and said first sub is assembled to said second sub by threaded connectors extending through said holes.

3. The flapper valve of claim 1, wherein said seat is provided on an insert slidably received in said passage.

4. The flapper valve of claim 3, wherein said insert is received in said second sub.

5. The flapper valve of claim 3, wherein said insert is captured in said passage between said first sub and said second sub.

6. The flapper valve of claim 3, wherein said insert is restricted from rotating within said passage.

7. The flapper valve of claim 6, wherein said insert is restricted from rotating within said passage by a pin extending between said insert and said first sub.

8. The flapper valve of claim 3, wherein said seat is provided on a beveled surface of said insert.

9. The flapper valve of claim 1, wherein said cap has a skirt depending therefrom and extending downward into said port, said skirt defining a blind chamber within said cap.

10. The flapper valve of claim 9, wherein said valve comprises a filler body disposed within said chamber in said cap.

11. The flapper valve of claim 10, wherein clearances are provided between said filler body and said skirt.

12. The flapper valve of claim 10, wherein said filler body is adapted to substantially preclude circulation of fluid in said chamber.

13. A flow line for a high-pressure fluid transportation system, said flow line comprising the flapper valve of claim 1.

14. A high-pressure fluid transportation system, said system comprising the flow line of claim 13.

15. The system of claim 14, wherein said system is a system for fracturing a well.

16. A method for controlling flow through a fluid transportation system comprising a flow line, wherein said method comprises:
   (a) providing a flapper valve of claim 1 in said flow line; and
   (b) transporting fluid through said flow line.

17. A flapper valve for fluid transportation systems, said flapper valve comprising:
   (a) a valve body adapted for assembly into said system;
   (b) a passage defined in said body adapted to conduct fluids transported through said system;
   (c) a seat;
   (d) a flapper mounted for pivoting movement between a closed position, in which said flapper bears on said seat and shuts off back flow through said passage, and an open position, in which said flapper is pivoted away from said seat and allows fluid flow through said valve;
   (e) a service port and a cap removably closing said port, said cap having a skirt depending therefrom and extending downward into said port, said skirt defining a blind chamber within said cap, said cap having a continuous inner surface enclosing said blind chamber;
   (f) a filler body disposed within said chamber in said cap and occupying substantially the entire volume of said chamber, wherein clearances are provided between said filler body and said chamber, said clearances allowing said cap skirt to be energized radially outward by fluid flowing through said valve.

18. A flow line for a high-pressure fluid transportation system, said flow line comprising the flapper valve of claim 17.

19. A high-pressure fluid transportation system, said system comprising the flow line of claim 18.

20. The flapper valve of claim 17, wherein said filler body comprises a passage to facilitate ingress of fluids into said clearances.

21. A flow line for a high-pressure fluid transportation system for fracturing a well, said flow line comprising the flapper valve of claim 5.

22. A flow line for a high-pressure fluid transportation system for fracturing a well, said flow line comprising the flapper valve of claim 6.

23. A flow line for a high-pressure fluid transportation system for fracturing a well, said flow line comprising the flapper valve of claim 8.

24. A flow line for a high-pressure fluid transportation system for fracturing a well, said flow line comprising the flapper valve of claim 10.

25. A flow line for a high-pressure fluid transportation system for fracturing a well, said flow line comprising the flapper valve of claim 17.

26. A flow line for a high-pressure fluid transportation system for fracturing a well, said flow line comprising the flapper valve of claim 20.

* * * * *